United States Patent [19]
Chun

[11] Patent Number: 5,956,094
[45] Date of Patent: Sep. 21, 1999

[54] DEVICE FOR DIVISIONALLY DISPLAYING MONITORED AREAS ON A SCREEN AND METHOD THEREFOR

[75] Inventor: Doo-hwan Chun, Seoul, Rep. of Korea

[73] Assignee: SamSung Electronics Co., Ltd., Kyungki-do, Rep. of Korea

[21] Appl. No.: 08/922,309

[22] Filed: Sep. 2, 1997

[30] Foreign Application Priority Data

Sep. 2, 1996 [KR] Rep. of Korea ...................... 96-37906

[51] Int. Cl.$^6$ .............................. H04N 5/445; H04N 5/45
[52] U.S. Cl. ........................... 348/564; 348/565; 348/567
[58] Field of Search ................................... 348/564, 565, 348/567, 569, 584, 588, 598, 48, 47; H04N 5/45, 5/445

[56] References Cited

U.S. PATENT DOCUMENTS 5,142,367  8/1992  Hong .
5,144,438  9/1992  Kim .
5,452,012  9/1995  Saitoh ..................................... 348/563

*Primary Examiner*—Sherrie Hsia
*Attorney, Agent, or Firm*—Robert E. Bushnell, Esq

[57] ABSTRACT

A device for displaying image signals received from a plurality of monitoring cameras are displayed on sub-screens, and a method therefor. First, a sub-screen displaying mode is set, and the number of sub-screens to be divided is input. When the number of channels of input image signals is greater than that of sub-screens, the numbers of channels to be displayed in a continuous mode and the locations of sub-screens to be operated in switching mode are input. The channels of the continuous mode are displayed continuously on corresponding sub-screens, and other channels alternately displayed on the rest sub-screens.

20 Claims, 4 Drawing Sheets

DEVICE FOR DIVISIONALLY DISPLAYING MONITORED AREAS ON A SCREEN AND METHOD THEREFOR

CLAIM OF PRIORITY

This application makes reference to, incorporates the same herein, and claims all benefits accruing under 35 U.S.C §119 from an application entitled Device For Divisionally Displaying Monitored Areas On A Screen And Method Therefor earlier filed in the Korean Industrial Property Office on Sep. 2, 1996, and there duly assigned Serial No. 96-37906 by that Office.

BACKGROUND OF THE INVENTION

1. Field of the Invention

The present invention relates to a monitoring device and a method therefor, and more particularly, to a device for divisionally displaying monitored areas photographed by a plurality of monitoring-cameras on a single screen, and a method therefor.

2. Description of the Related Arts

In general, monitoring systems such as a closed circuit television (CCTV) system, several areas to be monitored are photographed by a plurality of cameras, and the photographed images are displayed on a plurality of monitors.

In such monitoring systems, a screen displayed on the monitor usually keeps showing motionless pictures until a moving object appears on the screen. Since an operator has to watch the motionless pictures for a long time, he or she easily feels bored and may neglect his or her work. Thus, two or more operators may be required for enhancing the monitoring efficiency.

Meanwhile, in order to reduce the number of monitors for displaying image signals photographed in a monitoring system, techniques of screen division have been employed. U.S. Pat. No. 5,142,367 to Sam P. Hong and entitled System For Divisionally Displaying Plural Images On A Screen is one such system, wherein four cameras supply video signals to one monitor and the screen of that monitor is divided into four sections for displaying the images provided by the cameras simultaneously. In such a system the screen is divided into several sub-screens each on which image signals photographed by a corresponding number of camera is displayed. In such systems, however, in order to display images from more than four cameras it becomes necessary to divide the screen into smaller image areas, thus monitoring efficiency will be lowered.

SUMMARY OF THE INVENTION

It is an object of the present invention to provide a monitored-screen divisionally-displaying apparatus whereby monitoring efficiency can be maintained by reducing an operator's tiresomeness and preventing sub-screens from being downsized in spite of an increase in number of cameras.

To accomplish the above object, in the present invention, the screen of a monitor is divided into a predetermined number of screens, a picture photographed at essential positions set by an operator is continuously displayed on a portion of the predetermined number of sub-screens, and pictures at the other positions are alternately displayed on other sub-screens.

When a moving object in a picture on a sub-screen is captured during operation, that sub-screen is frozen so that an operator can have a detailed look at the still picture.

According to an aspect of the present invention, the moving object is automatically detected by detecting a movement in the picture and analyzing the movement amount.

According to another aspect of the present invention, the operator visually observes a moving object and manually freezes its corresponding sub-screen.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
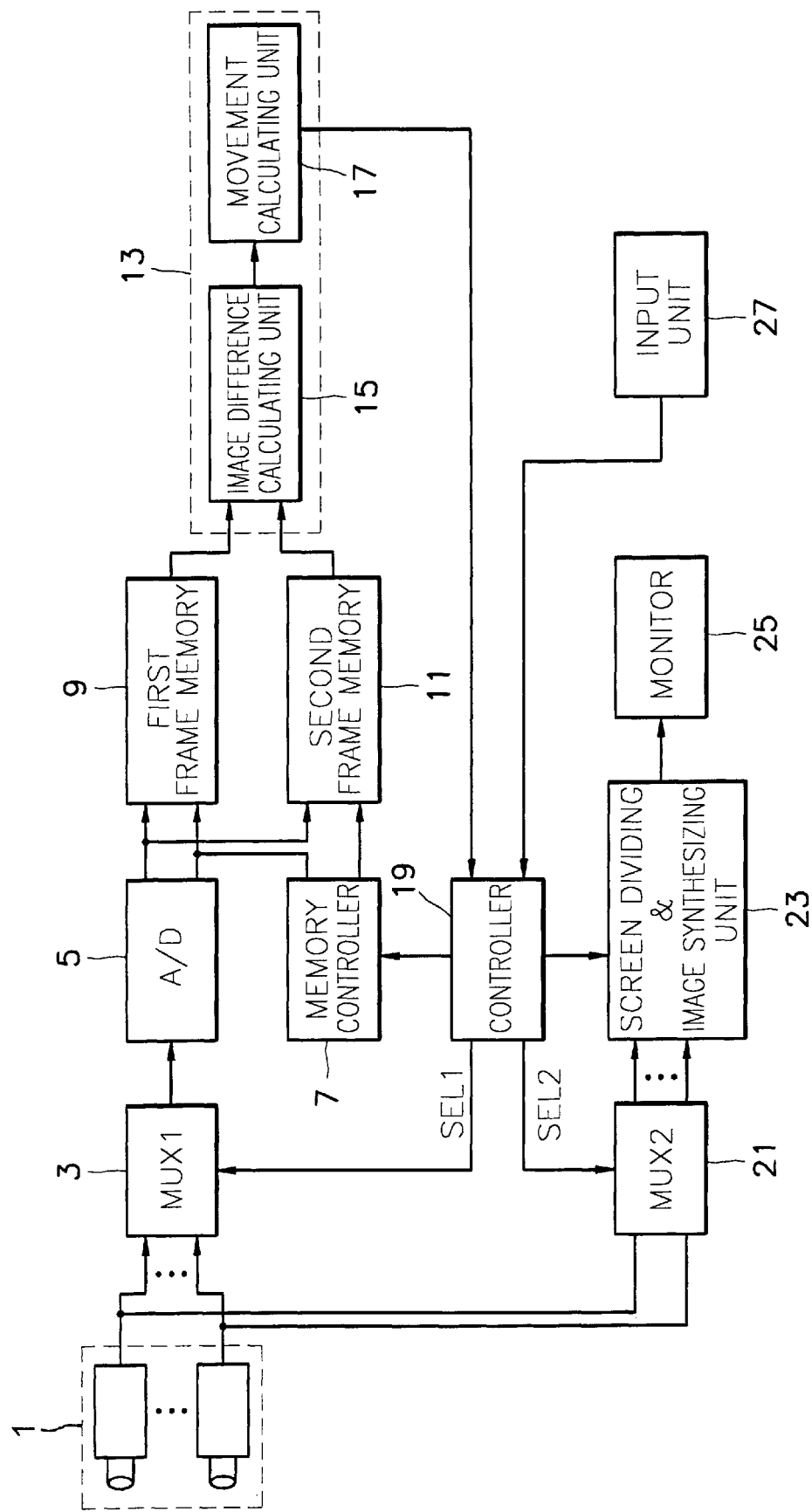
FIG. 1 is a block diagram of a device for divisionally displaying monitored areas according to the principles of the present invention.

Referring to FIG. 1, a preferred embodiment of a device for divisionally displaying monitored areas according to the principles of the present invention includes a plurality of monitoring cameras 1, a multiplexer (MUX1) 3, an analog-to-digital (A/D) converter 5, a memory controller 7, first and second frame memories 9 and 11, a movement calculating unit 13, a controller 19, a multiplexer (MUX2) 21, a screen-dividing and image synthesizing unit 23, and a monitor 25.

Multiplexer 3 selectively outputs image signals from the plurality of monitoring cameras 1 in response to a selection signal SEL1. Multiplexer 21 selectively outputs image signals from the plurality of monitoring cameras 1 through a predetermined number of output lines in response to a selection signal SEL2.

A/D converter 5 converts an image signal output by multiplexer 3 into digital image data.

Memory controller 7 outputs an address signal and a read/write signal to frame memories 9 and 11 under the control of controller 19.

Frame memories 9 and 11 store the digital image data of the current and previous frame, respectively, from A/D converter 5 in frame units according to the control of memory controller 7. Here, frame memory 9 stores the digital image data of the previous frame, and frame memory 11 stores the digital image data of the current frame.

Movement detection unit 13 detects a movement within an image signal. In movement detection unit 13, an image difference calculator 15 subtracts the image signal output by frame memory 11 from that output by frame memory 9 to calculates an image difference in pixel units. Also, a movement calculating unit 17 calculates the amount of movement using the image difference. The calculation of movement can be performed by using a typical movement calculating algorithm such as a centroid tracking algorithm or a block matching algorithm.

Controller 19 generates a selection signal SEL1 for selecting one of the plurality of image signals received from the plurality of monitoring cameras 1 at a predetermined interval, and outputs the selection signal SEL1 to multiplexer 3. Also, controller 19 generates a selection signal SEL2 for selecting and outputting a predetermined number of signals among the plurality of image signals received from the plurality of monitoring cameras 1, and outputs selection signal SEL2 to multiplexer 21. Furthermore, controller 19 sets a monitoring mode with respect to a monitoring camera according to movement detected by movement calculating unit 13, and determines the number of sub-screens and an operation mode for each sub-screen according to the monitoring mode of the corresponding camera. Then, controller 19 generates a control signal to control screen dividing and image synthesizing unit 23.

Screen dividing and image synthesizing unit 23 receives a predetermined number of image signals selected by multiplexer 21, divides a screen, and synthesizes the image signals to output the result to monitor 25 according to the control signal of controller 19.

Also, an input unit 27 receives an operation command from an operator and outputs the operation command to controller 19.

Meanwhile, in another embodiment of the present invention, frame memory 9 can be omitted. In this case, image difference calculator 15 calculates the difference between an image signal stored in frame memory 11 and an image signal sequentially output by A/D converter 5 in pixel units.

The operation of the above device will now be described in more detail, referring to FIGS. 2 through 4.

First, the operator sets a sub-screen display mode via input unit 27 in step 100. At this time, the operator also inputs the number of sub-screens to be divided.

Next, controller 19 determines in step 200 whether the number of channels of input image signals is greater than that of subscreens set in step 100. When the number of channels for input image signals is not greater than that of sub-screens, the input pictures are displayed on the respective sub-screens in step 300.

On the other hand, when the number of channels for input image signals is greater than that of the sub-screens, the operator sets the channel numbers of camera locations having images to be continuously displayed on respective sub-screens and the channel numbers of camera locations having images to be switched for display on one sub-screen in step 400.

Accordingly, the input pictures are displayed on the sub-screens in step 500.

In the present invention, there are three operation modes for each sub-screen: a continuous mode in which an image signal of a channel is continuously displayed, a switching mode in which image signals of a plurality of channels are alternatively displayed, and a freezing mode in which a still signal of a channel is continuously displayed.

Figure 3:
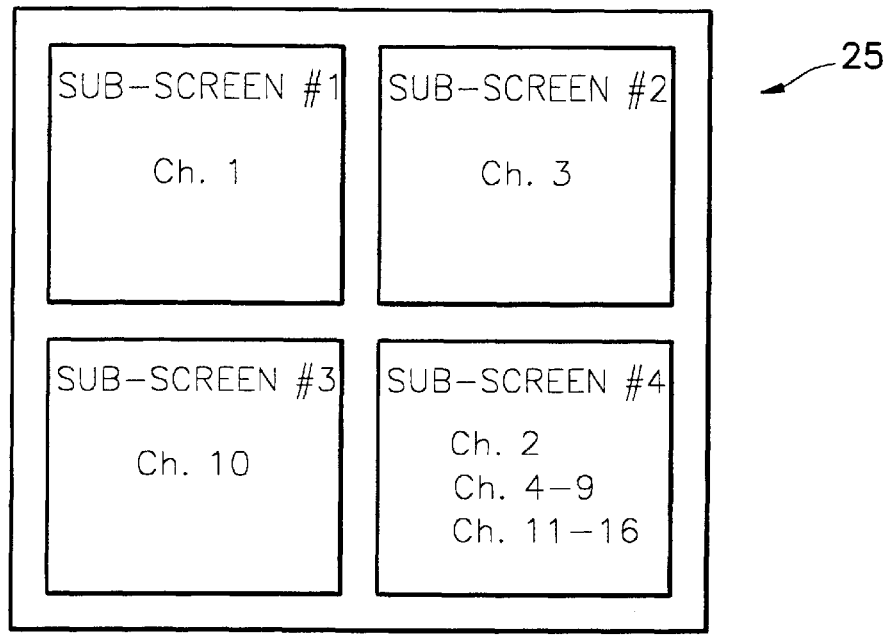
FIG. 3 shows an example of divided screens and image channels displayed on the divided sub-screens.
Figure 4:
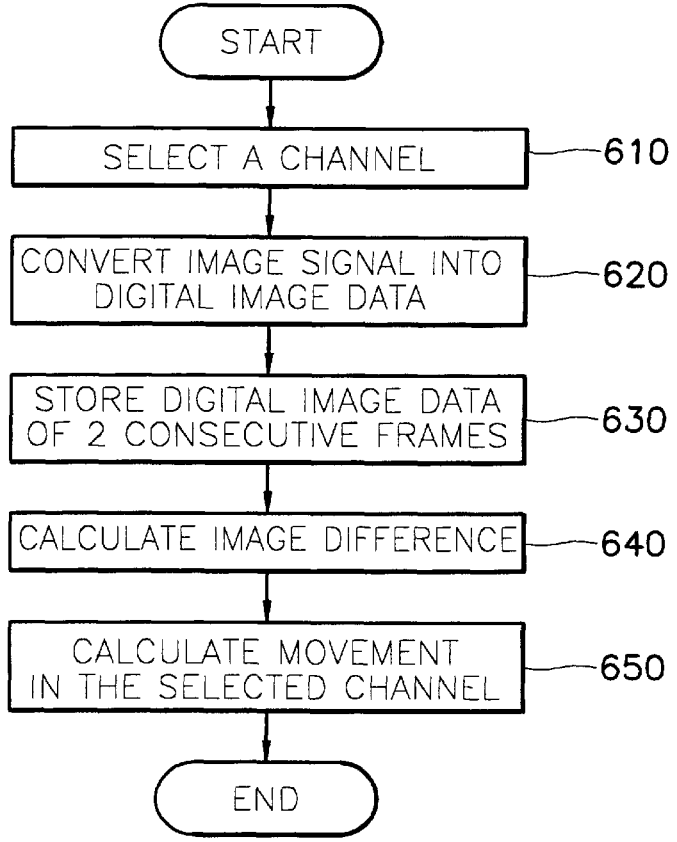
FIG. 4 is a flowchart outlining a process for calculating a movement according to the principles of the present invention.

FIG. 3 shows an example of divided sub-screens and image channels displayed on the divided sub-screens. In FIG. 3, it is assumed that 16 input image signals are received from 16 cameras, and that a monitor is divided into four sub-screens in the present embodiment. Also, it is assumed that channels 1, 3 and 10 are set as the channel numbers to be continuously displayed in step 400, and that a fourth sub-screen is set as a sub-screen to be switched. Accordingly, pictures of the channels 1, 3 and 10 are continuously displayed on the first, second and third sub-screens, respectively. Meanwhile, pictures of the 13 channels other than channels 1, 3 and 10 are alternately displayed on the fourth sub-screen.

If there is a channel for which a still picture must be displayed because a movement is detected in a picture during operation, the picture corresponding to the channel is frozen. In FIG. 2, steps 600 to 1300 relate to the freezing operation.

In step 600, the controller 19 determines whether there is a channel to be frozen.

In the present embodiment, the determination of whether a channel is to be frozen exists is automatically made by detecting movement within a picture.

The movement detecting procedure will be described in more detail with reference to FIG. 4. First, one of the input channels is selected every predetermined time interval by the multiplexer 3 in step 610. The image signal of the selected channel is converted into digital image data in step 620. Then, the digital image data is stored in frame memories 9 and 11 in step 630. An image difference is calculated by reading out two sequential frames of digital image data in step 640. Thereafter, movement is calculated by the image difference calculated by use of a conventional movement calculating algorithm in step 650.

Meanwhile, in another embodiment of the present invention, the freezing operation is determined by an operator applying a command via input unit 27. That is, when a moving object is seen while the operator observes a screen, the operator can freeze the corresponding sub-screen by applying a freezing command to have a minute look at the moving object.

If it is determined in step 600 that there is a channel to be frozen, the sub-screen of the corresponding channel is frozen and the image of the corresponding channel is output as a still picture in step 700.

In step 800, it is determined whether the frozen subscreen is a sub-screen of continuous mode or a sub-screen of switching mode.

When the frozen sub-screen is the sub-screen of continuous mode, it does not matter since it has no effect on the display of another channel. However, when the frozen subscreen is the switching mode sub-screen and the number of switching mode sub-screens is only one, one of the subscreens of continuous mode must be changed into a switching mode sub-screen to accomodate the channels not frozen.

For that purpose, a sub-screen adjacent to the frozen subscreen is selected in step 900. At this time, it is determined whether the selected sub-screen is also frozen in step 1000. If the selected sub-screen is not frozen, the selected sub-screen is operated in the switching mode in step 1100, and input images are displayed on the sub-screens (step 500).

On the other hand, if it is determined in step 1000 that the selected sub-screen is frozen, another sub-screen is selected. If all of the sub-screens are frozen, step 1200, a switching operation is paused, step 1300, and a still image is displayed on each of the sub-screens.

Figure 2:
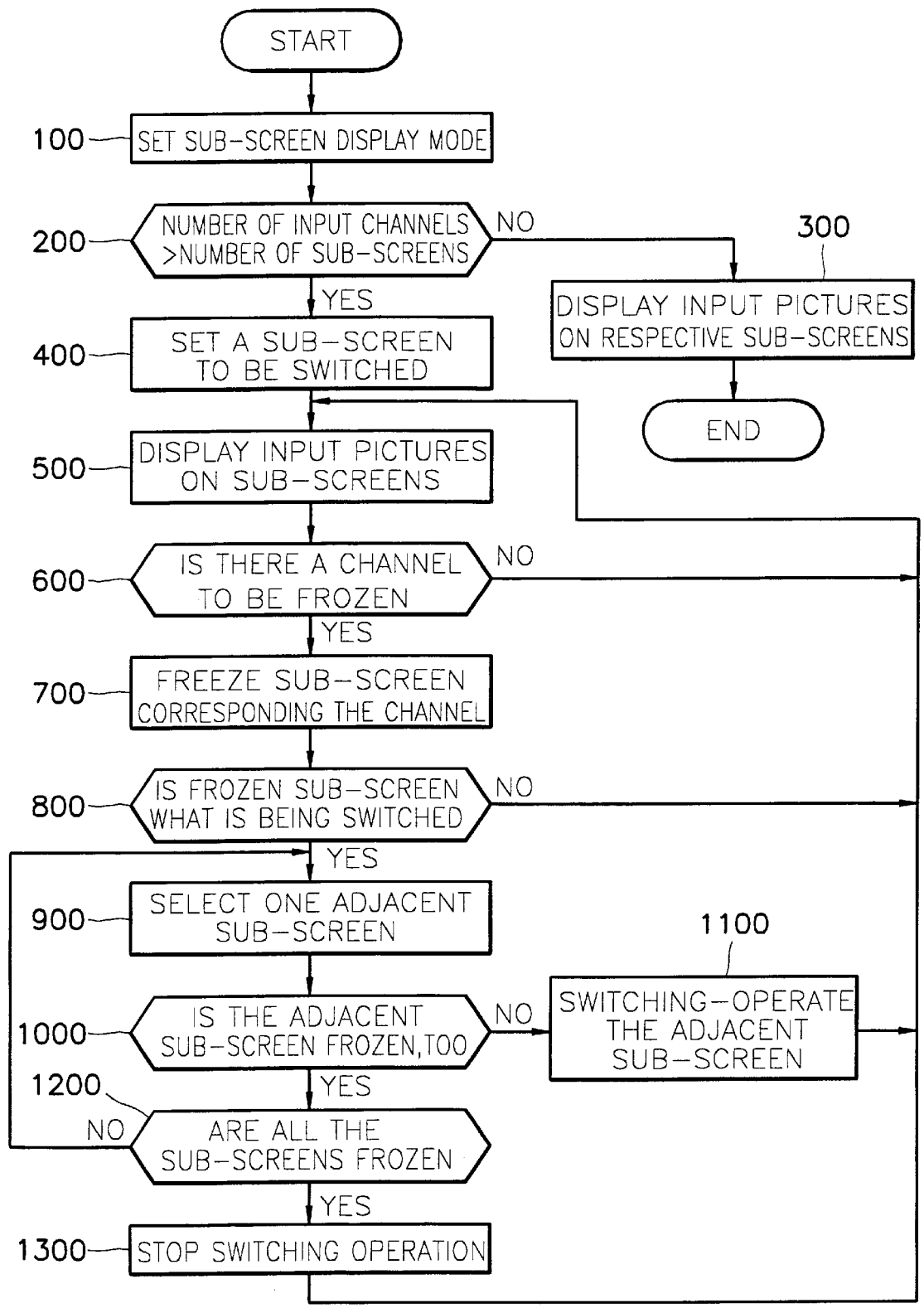
FIG. 2 is a flowchart outlining a method for divisionally displaying monitored areas according to the principles of the present invention.
Figure 5:
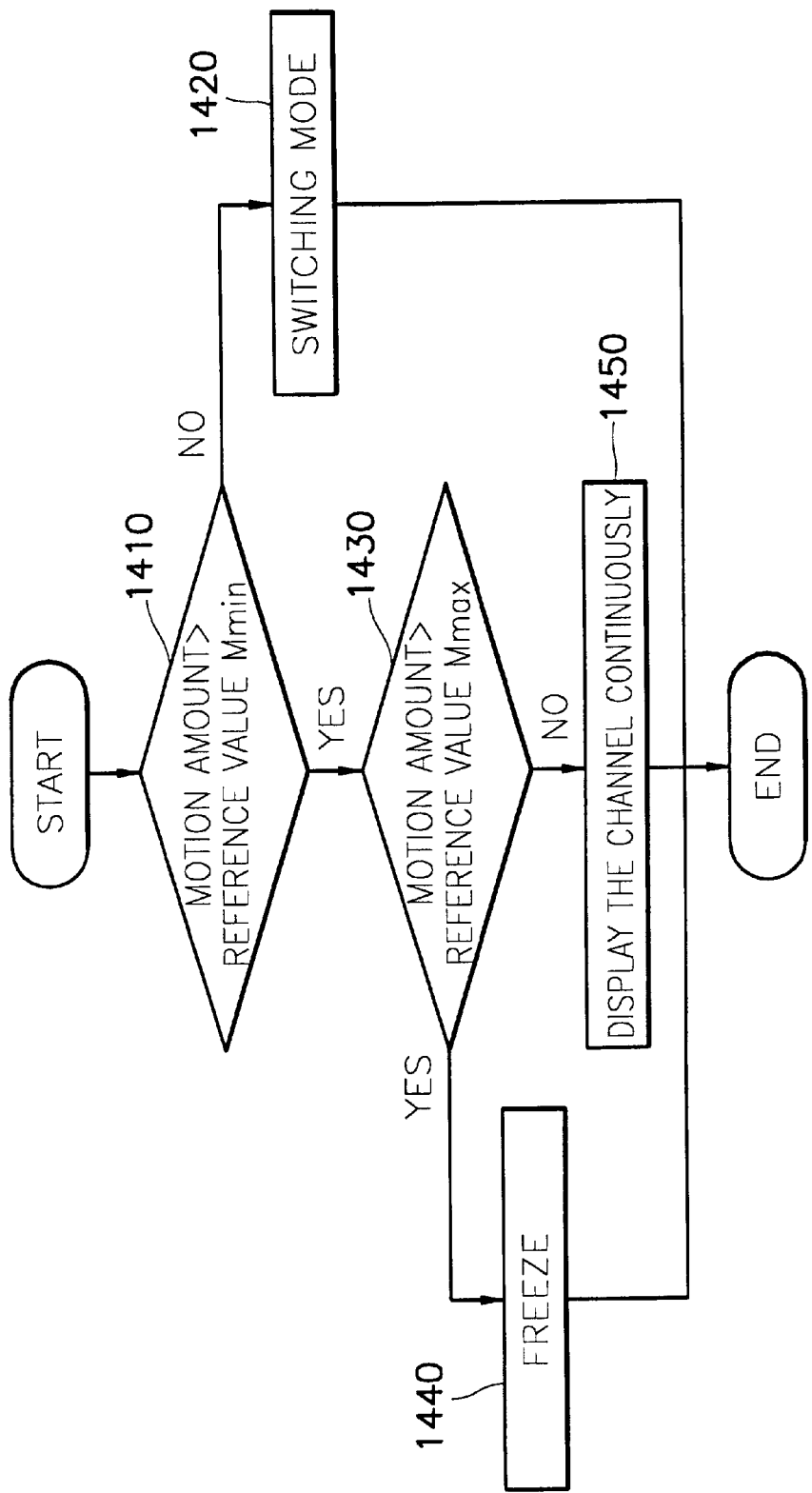
FIG. 5 is a flowchart outlining a process of setting a monitoring mode in another embodiment of the present invention.

Meanwhile, in another embodiment of the present invention, the device of FIG. 2 can be operated by calculating the movement with respect to each of the input channels and setting a monitoring mode for each channel according to the calculated motion amount. FIG. 5 is a flowchart outlining the procedure for setting the monitoring mode for each channel according to the calculated motion amount.

First, in FIG. 5, controller 19 determines, in step 1410 whether the calculated motion amount is greater than a minimum reference value (Mmin), according to the motion amount calculated by movement calculating unit 13. If the calculated motion amount is smaller than the minimum reference value (Mmin), a switching mode is allocated to the corresponding monitoring camera in step 1420. On the other hand, if the motion amount is greater than the minimum reference value (Mmin), a determination of whether the movement amount is greater than a maximum reference value (Mmax) is made in step 1430. If the movement amount is greater than the maximum reference value (Mmax), the corresponding channel is frozen in step 1440. Otherwise, a continuous mode is allocated so that the image signal of the corresponding channel is continuously displayed in step 1450. If the number of channels of the continuous mode and the freezing mode increase, sub-screens of switching mode are allocated to channels of continuous mode or the freezing mode. When the number of sub-screens is not enough yet, the channels of the continuous mode are switched and displayed alternately.

What is claimed is:

1. A device for displaying image signals received from a plurality of monitoring cameras on subscreens of at least one monitor, said device comprising:

first signal selecting means for selecting a first predetermined number of image signals among a plurality of image signals in accordance with a first selection signal and outputting the selected image signal;

controlling means for generating the first selection signal and outputting the first predetermined number representing a number of sub-screens to be divided, and an operation mode for each of sub-screens according to information on movement existing in each of the image signals; and screen dividing and image synthesizing means for receiving the first predetermined number and the operation mode for each sub-screen from said controlling means, dividing the screen on said monitor into the first predetermined number, and synthesizing the first predetermined number of image signals to a single image, wherein the operation mode of said sub-screens includes a switching mode, a continuous mode and a freezing mode, wherein a portion of the first predetermined number of image signals is displayed in the continuous mode, the rest of image signals are displayed in the switching mode, and an image signal having a large motion amount is displayed in the freezing mode in response to a control command from said controlling means.

2. The device as claimed in claim 1, further comprising input means for receiving the number of sub-screens to be divided and the operation mode for each sub-screen and providing the number of sub-screens and the operation mode to said controlling means.

3. The device as claimed in claim 1, further comprising:
   second signal selecting means for selecting one of the plurality of image signals according to a second selection signal and outputting the selected signal;
   an analog-to-digital converter for converting an image signal selected by said second signal selecting means into digital image data and outputting the converted image data;
   a first frame memory for storing the digital image data, output by said analog-to-digital converter in frame units; and
   movement calculating means for calculating a movement in pictures from the digital image data stored from said first frame memory.

4. The device as claimed in claim 3, wherein said movement calculating means comprises:
   an image difference calculator for calculating a pixel unit image difference between digital image data stored in said frame memory and digital image data output by said analog-to-digital converter; and
   a movement calculator for calculating a movement by comparing the image difference calculated by said image difference calculator with a reference value.

5. The device as claimed in claim 3, further comprising a second frame memory for storing an image of a previous frame, wherein said movement calculating means comprises:
   an image difference calculator for calculating an image difference by comparing digital image data stored in said first and second frame memories; and
   a movement calculator for calculating a movement by comparing the image difference calculated by said image difference calculator with a reference value.

6. A method for displaying image signals received from a plurality of monitoring cameras are displayed on subscreens, comprising the steps of:
   (a) setting a sub-screen display mode and inputting the number of sub-screens to be divided;
   (b) making a determination of whether the number of channels of input image signals is greater than the number of the sub-screens to be divided;
   (c) inputting the numbers of channels and the locations of sub-screens to be displayed in a continuous mode whenever said determination establishes that the number of channels of input image signals is greater than the number of screens to be displayed; and
   (d) continuously displaying the channels to be displayed in the continuous mode on the corresponding sub-screens, and alternately displaying other channels on the rest sub-screens.

7. The method as claimed in claim 6, further comprising the steps of:
   (e) determining a channel to be frozen;
   (f) freezing sub-screens displaying images obtained via said channel to be frozen as still pictures;
   (g) determining whether the frozen sub-screen is a sub-screen displayed in the continuous mode or the switching mode; and
   (h) operating one of adjacent sub-screens in the switching mode if the frozen sub-screen is a sub-screen which are displayed in the switching mode.

8. The method as claimed in claim 7, wherein, in step (e), the determination of the channel to be frozen is made by calculating movements in pictures.

9. The method as claimed in claim 7, wherein, in step (e), the determination of the channel to be frozen is made by an operator.

10. The method as claimed in claim 7, wherein said step (h) comprises the steps of:
    (h1) selecting one of sub-screens adjacent to the frozen sub-screen;
    (h2) determining whether a sub-screen selected in step (h1) is frozen or not;

(h3) operating the selected sub-screen in the switching mode if it is determined in step (h2) that the selected subscreen is not frozen; and (h4) stopping a switching operation and displaying a still image on each sub-screen if all of the sub-screens are frozen.

11. A device for divisionally displaying images of plural monitored areas on a display screen, comprising:

a plurality of cameras for monitoring predetermined areas, wherein each of said cameras outputs a corresponding image of respective ones of said monitored areas over respective channels;

first multiplexing means for selectively providing each of said images to an analog-to-digital converter;

said analog-to-digital converter for converting said images to frames of digital data;

means responsive to said digital data for determining whether there is movement in any one of said images by detecting a difference between successive ones of said frames of digital data;

second multiplexing means for selectively providing each of said images output from said cameras to plural output lines;

synthesizing means for initially combining a predetermined number of said images on said output lines into a display image for display on said display screen by dividing said screen into a predetermined number of sub-screens having a continuous display mode for displaying selected ones of said channels continuously and another sub-screen having a switched display mode for selectively displaying each of said channels other than said selected ones of said channels; and controller means for controlling said first and second multiplexing means and said synthesizing means, wherein said controller means is responsive to said means for determining whether there is movement in any one of said images for controlling said synthesizing means to freeze a displayed channel when movement is determined.

12. The device as set forth in claim 11, wherein said means for determining whether there is movement in any one of said images comprises:

a first frame memory for storing a first frame of digital data of a selected one of said images;

a second frame memory for storing a second succeeding frame of digital data of said selected one of said images;

image difference calculating means for comparing said first and second frames to calculate a difference between said first and second frames; and movement calculating means responsive to the calculated difference for determining whether there is movement in said selected one of said images.

13. The device as set forth in claim 11, wherein said controller means comprises an input unit for user input of data for controlling how many sub-screens said display screen is divided into and for controlling which of said channels is to be displayed on said predetermined number of continuous display mode sub-screens.

14. The device as set forth in claim 12, wherein said controller means comprises:

a memory controller for providing address data and read/write control signals to said first and second frame memories; and an input unit for user input of data for controlling how many sub-screens said display screen is divided into and for controlling which of said channels is to be displayed on said predetermined number of continuous display mode sub-screens.

15. The device as set forth in claim 11, wherein said means for determining whether there is movement in any one of said images comprises:

a frame memory for storing a frame of digital data of a selected one of said images;

image difference calculating means for comparing said stored frame of digital data to a succeeding frame of digital data output from said analog-to-digital converter to calculate a difference therebetween; and movement calculating means responsive to the calculated difference for determining whether there is movement in said selected one of said images.

16. The device as set forth in claim 15, wherein said controller means comprises:

a memory controller for providing address data and read/write control signals to said frame memory; and an input unit for user input of data for controlling how many sub-screens said display screen is divided into and for controlling which of said channels is to be displayed on said predetermined number of continuous display mode sub-screens.

17. The device as set forth in claim 11, wherein said controller means determines whether a total number of said channels is greater than a total number of said sub-screens and controls said second multiplexing means and said synthesizing means for combining said images of each of said channels into said display image when it is determined that said total number of said channels is not greater than said total number of said sub-screens.

18. The device as set forth in claim 11, wherein said controller means converts said continuous display mode of an adjacent one of said sub-screens to a switched display mode by determining that a frozen displayed channel corresponds to said switched display mode sub-screen.

19. The device as set forth in claim 18, wherein said controller means determines whether said adjacent one of said sub-screens is frozen before converting said continuous display mode of said adjacent one of said sub-screens to said switched display mode, and, upon determining that said adjacent one of said sub-screens is frozen determining whether all of said sub-screens are frozen, and, upon determining that all of said sub-screens are frozen, preventing any of said sub-screens from operating in said switched display mode.

20. The device as set forth in claim 19, wherein said controller means converts a first one of said continuous display mode sub-screens found not to be frozen into a switched display mode sub-screen when it is determined that not all of said sub-screens are frozen.

* * * * *